United States Patent [19]

Morman et al.

[11] 4,451,589
[45] May 29, 1984

[54] METHOD OF IMPROVING PROCESSABILITY OF POLYMERS AND RESULTING POLYMER COMPOSITIONS

[75] Inventors: Michael T. Morman, Appleton; Tony J. Wisneski, Kimberly, both of Wis.

[73] Assignee: Kimberly-Clark Corporation, Neenah, Wis.

[21] Appl. No.: 472,524

[22] Filed: Mar. 7, 1983

Related U.S. Application Data

[63] Continuation-in-part of Ser. No. 273,938, Jun. 15, 1981, abandoned.

[51] Int. Cl.³ .............................................. C08L 91/06
[52] U.S. Cl. ..................................... 523/124; 264/142; 264/211; 525/387
[58] Field of Search ................... 264/176 R, 142, 211, 264/114; 525/387; 523/124

[56] References Cited

U.S. PATENT DOCUMENTS

| | | | |
|---|---|---|---|
| 2,919,474 | 1/1960 | Cole | 264/174 |
| 2,930,083 | 3/1960 | Vostovich et al. | 264/174 |
| 3,028,354 | 4/1962 | Messier | 525/387 |
| 3,036,981 | 5/1962 | Rorr | 525/387 |
| 3,143,584 | 8/1964 | Roberts et al. | 264/176 F |
| 3,144,436 | 8/1964 | Green et al. | 264/176 F |
| 3,755,527 | 8/1973 | Keller et al. | 264/176 F |
| 3,780,149 | 12/1973 | Kenchell et al. | 264/171 |
| 3,849,241 | 11/1974 | Butin et al. | 264/176 F |
| 3,887,534 | 6/1975 | Baba et al. | 264/176 F |
| 3,923,947 | 12/1975 | Cook | 525/387 |
| 3,940,379 | 2/1976 | Castazna et al. | 525/387 |
| 3,978,185 | 8/1976 | Bustin et al. | 264/93 |
| 4,029,729 | 6/1977 | Rees et al. | 264/349 |
| 4,123,584 | 10/1978 | Brewton | 264/37 |
| 4,225,650 | 11/1980 | Bredevode et al. | 525/387 |

FOREIGN PATENT DOCUMENTS 1442681 7/1976 United Kingdom ................ 264/211

*Primary Examiner*—Jay. H. Woo
*Attorney, Agent, or Firm*—William D. Herrick; R. Jonathan Peters; Howard Olevsky

[57] ABSTRACT

A specific class of thermoplastic polymers with improved processability resulting from initial partial degradation of high molecular weight polymers using a chemical prodegradant present in excess of the amount reacted during pelletization. This class of polymers includes polymers and copolymers of polypropylene and butylene. After pelletizing, the polymer including unreacted prodegradant can be safely handled and shipped without difficulty. When remelted by extruding or the like, the prodegradant in the pellets reacts, further reducing the molecular weight as well as narrowing the molecular weight distribution of the polymer to a point where high capacity production of quality fibers and extruded products can be obtained.

The prodegradant is preferably of the type that predictably and controllably affects the polymer molecular properties without being significantly affected by minor fluctuations in the polymer producer's or processor's manufacturing steps.

Specific preferred embodiments include 2,5-dimethyl - 2,5 bis-(t-butylperoxy) hexyne-3; 3,6,6,9,9-pentamethyl-3-(ethyl acetate)-1,2,4,5-textraoxy cyclononane; $\alpha,\alpha'$-bis (t-butylperoxy) diispropyl benzene and 2, 5-dimethyl-2, 5-di (t-butylperoxy) hexane as the prodegradant added in an amount providing an amount of unreacted prodegradant after pelletizing of about 0.01 to 10.0 percent based on the weight of polymer. The present invention reduces the safety hazards present when handling free radical prodegradants by the polymer processor and avoids the need for multiple addition of prodegradants while still producing a material that can be processed easily by the polymer producer and processor.

19 Claims, 2 Drawing Figures

METHOD OF IMPROVING PROCESSABILITY OF POLYMERS AND RESULTING POLYMER COMPOSITIONS

CROSS REFERENCE TO RELATED APPLICATION

This application is a continuation-in-part of copending application Ser. No. 273,938, filed June 15, 1981, now abandoned.

BACKGROUND OF THE INVENTION

1. Field of the Invention

This invention relates to pellets of a specific polymer class including polymers and copolymers of polypropylene and butylene having improved processing characteristics for spinning, meltblowing, extruding and the like, as well as methods for obtaining them. A good processing polymer of this class for fiber or film formation desirably has the following attributes:

(1) the ability to be attenuated when molten without breaking—this allows high through-put production of fine filaments and thin films which have high strength relative to unattenuated products; and
(2) the ability to be pumped through piping and capillaries and/or be attenuated as a fiber or film requiring a minimum of energy—this means lower shear and extensional viscosities for the polymer melt. It has been demonstrated that the first attribute (high attenuability) can be attained with a polymer of this class having a narrow molecular weight distribution (defined as the polymer weight average molecular weight divided by the polymer number average molecular weight). The second attribute (low shear and extensional viscosities) is attained with a lower weight average molecular weight polymer.

Catalysts presently used in the commercial production of this polymer class produce polymers having too broad a molecular weight distribution coming out of the polymerization reactor for production of fine fibers or thin films. Thus, low weight average molecular weight polymer out of such a reactor would have the desired low viscosity for processing, but would not be attenuable to the desired extent. Polymer producers have, therefore, found it necessary to make a very high weight average molecular weight polymer followed by a random molecular scission step (thermal, radiation, or chemical degradation) which inherently narrows the molecular weight distribution while at the same time reduces the weight average molecular weight to the desired level.

Polymers of this class are degraded chemically by addition of compounds that decompose forming free radicals. While it is not desired to be limited to any particular theory, it is believed that the free radicals extract a hydrogen from the polymer backbone, and the backbone splits at that point, forming two shorter molecules. Other polymers act differently. For example, the polyethylene backbone does not split; instead, the active site previously occupied by the hydrogen attaches another polyethylene molecule, crosslinking and forming a nonmelting gel or solid. This phenomenon is used commercially to make unmeltable solid polyethylene parts.

Chemical stabilizers added to the class of polymers defined herein enhance end-use stability and may interfere with free radical generators in some cases. However, it has been found that some free radical generator types of chemicals, such as the specific types of organic peroxides described in British Patent 1,442,681 for example, are minimally affected by commonly used stabilizers and are, thus, preferred prodegradants.

The degree to which the polymer can be degraded is limited, however, by the inability of the polymer producer (used herein in reference to the manufacturer of the polymer and polymer pellets) to form pellets from very low viscosity polymers. Therefore, the polymer processor (used herein in reference to the user of the polymer pellets) manufacturing films and fibers faces the problem of having to use a polymer not optimally suited for these applications. Thus, a need has been demonstrated for a polymer having high viscosity properties for polymer producer pelletizing purposes and low viscosity properties for polymer processor end use processing purposes.

DESCRIPTION OF THE PRIOR ART

Low viscosity polymers desirable to processors cannot presently be pelletized at commercial rates by polymer producers without producing an excess of "stringers" (pellets with long tails) which plug producers' and processors' conveying equipment.

The polymer viscosity can be increased for pelletizing, however, by running the pelletizer at a temperature just above the polymer melting point to improve pellet cut. This can be done only at a low throughput to reduce the heat generated by shear forces in the pelletizing equipment and/or by controlled cooling of the molten polymer—both adding considerably to the process cost and complexity.

It has also been suggested that the end use processor apply additional chemical prodegradant onto the polymer pellets prior to extrusion to reduce the polymer viscosity during extrusion to the desired level prior to fiber or film formation. However, there are several disadvantages to this approach:

(1) The topically applied prodegradants coat the inside of conveying equipment. Since the peroxide prodegradants are fire/explosion hazards, special handling procedures and equipment are required.
(2) The peroxide must be uniformly dispersed within the polymer before it decomposes and reacts—otherwise a polymer with variable viscosity may result with an even broader molecular weight distribution than the original polymer. The polymer producer, having access to specialized equipment and the fine reactor flakes rather than pellets, is in a much better position to achieve this uniform distribution.
(3) The peroxide is more efficient as a prodegradant if well dispersed before reacting.
(4) The processor's equipment may be damaged by a variable viscosity polymer.
(5) The peroxide applied onto the pellets rather than dispersed within them acts as a lubricant in extruder feed sections reducing throughput for a given extruder screw speed.

The processor may also reduce the molecular weight by using very high temperatures to thermally degrade the polymer. However, these very high temperatures (e.g. over 600° F. for polypropylene) lead to:

(1) reduced equipment life;
(2) throughput limitations because of quenching restraints;
(3) excessive energy consumption;

(4) hazardous operating environments; and
(5) additive problems. The additive problems include:
 (1) limited range of usable additives, requiring that more expensive or non-optimum additives be used;
 (2) excessive additive degradation, necessitating that more additive be added to the polymer than is required in the final product; and
 (3) plugging of polymer piping, capillaries, dies, and the like from the degradation products.

Additional information may be obtained by reference to prior patents. British Pat. No. 1,442,681 to Chemie Linz describes a process for the preparation of polypropylene including degradation with peroxide prodegradants producing a narrow molecular weight distribution propylene polymer. U.S. Pat. No. 3,887,534 to Baba, et al. describes the use of aliphatic peroxides as prodegradants for polypropylene and discusses problems related thereto but suggests that unreacted prodegradant is to be avoided. U.S. Pat. No. 3,144,436 to Greene, et al. describes a process for degrading steroregular polymers including the use of free radical initiators. In one embodiment a two-step method is described wherein there is controlled injection of the prodegradant into a melt zone of the extruder. U.S. Pat. No. 3,849,241 to Buntin, et al. and U.S. Pat. No. 3,978,185 also to Buntin, et al. describe meltblowing processes that are improved through controlled degradation of the polymers. U.S. Pat. No. 3,755,527 to Keller, et al. similarly describes advantages of polymer degradation.

SUMMARY

The present invention encompasses, (1) a stepwise method of chemically degrading a specific class of polymers including polymers and copolymers of propylene and butylene producing a polymer that is readily formed into pellets that when heated undergoes further chemical degradation producing a low viscosity polymer that can be conveniently processed into high quality films and fibers; and (2) prodegradant containing polymer in the form of pellets and the like resulting from this method. In addition, the invention includes forming concentrates of the peroxide prodegradant in a polymer which, when added to polymer pellets not containing peroxide, degrades the polymer in the non-peroxide-containing pellets as well.

The present invention results from the discovery that when certain free radical generating chemicals that act as polymer prodegradants are added to the polymer and the pelletizing equipment operated in a specified manner, e.g. under controlled minimum temperature and extruder residence time, a portion of the chemical survives the pelletizing process unreacted. After leaving the pelletizing extruder, the reaction is stopped by rapid polymer cooling. The remainder of the prodegradant chemical in the pellets is then available to react upon re-extrusion, producing a polymer that processes well and produces films and fibers with excellent properties. The exact remaining percentage of prodegradant after pelletizing by the producer is dependent on pelletizing temperature, prodegradant residence time at this temperature, and type of prodegradant. It will preferably be more than half and up to 97% of that originally added. Ideally, for pelletizing, no degradation takes place, but, as a practical matter, some prodegradant will react during pelletizing. The small amount reacting (as low as about 3%) only minimally reduces the polymer viscosity at the pelletizer, permitting well formed, free flowing pellets to be made. After pelletizing, residual prodegradant in an amount of at least 0.01 percent based on the weight of polymer is necessary for acceptable results to be obtained. In forming concentrates, the percentage may be as high as 10% in the pellets. Thus, the advantages of a two-step degradation addition method described above in connection with the prior art are retained, but the disadvantages are essentially eliminated.

DESCRIPTION OF THE PREFERRED EMBODIMENTS

Figure 1:
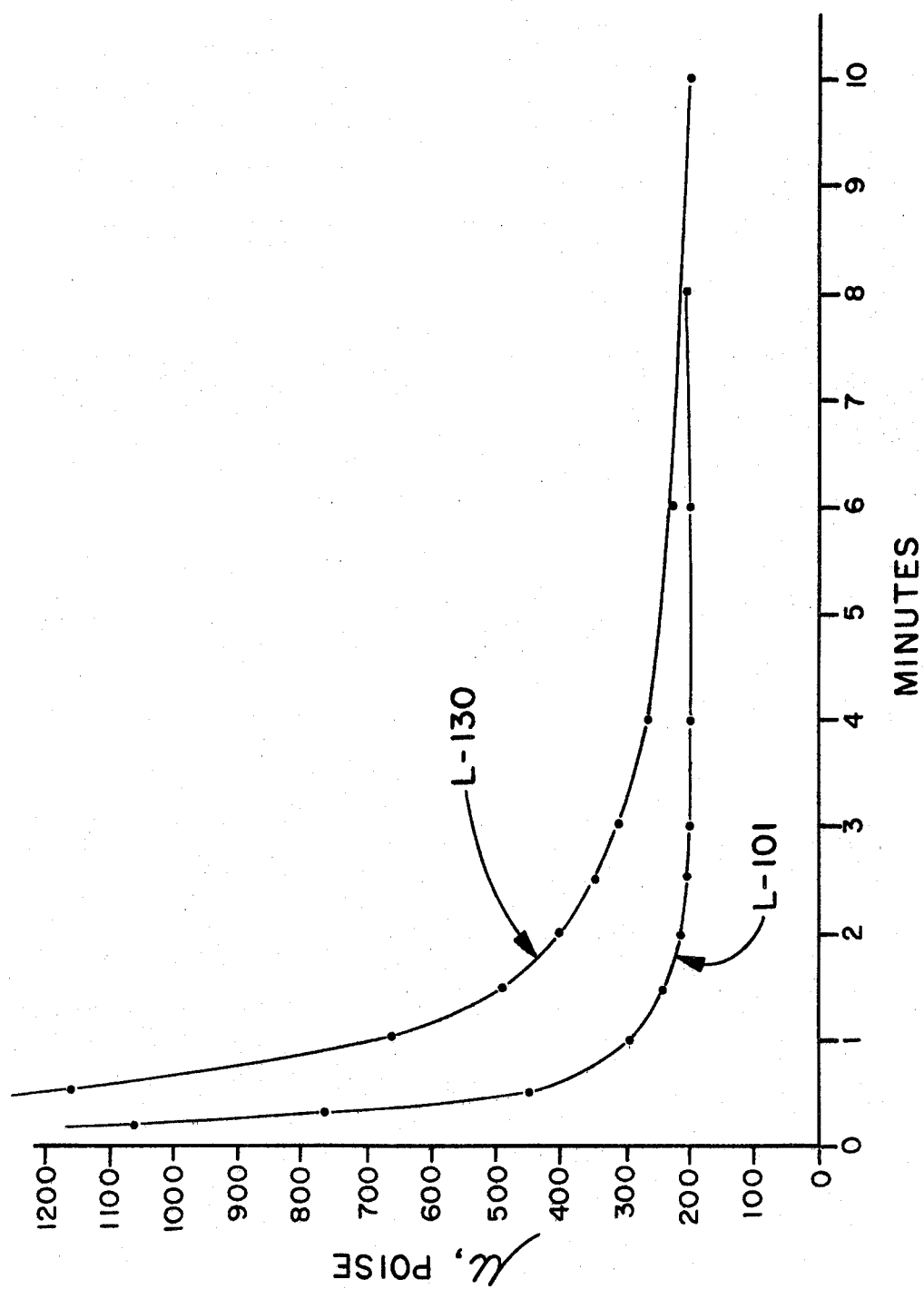
FIG. 1 is a graph showing the relationship between reaction time and polymer viscosity at extrusion temperatures for polypropylene with two prodegradant embodiments of the invention.

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims. Although the invention will be illustrated with reference to polypropylene, it will be recognized that it is more broadly applicable to polymers and copolymers of propylene and butylene.

It is also applicable to the processing of waste polymer material to permit reuse in film and fiber formation. Of course, as will be apparent to one skilled in the art, optimum operating conditions and concentrations will vary depending upon the properties of the polymer being used and the ultimate properties desired by the processor. The invention is not applicable to polymers such as polyethylene that cross-link in the presence of free radicals forming nonmelting solids. In such cases, rather than reducing viscosity as occurs in chain scission, cross-linking and solidification occur which would plug equipment.

As produced, polypropylene generally has a high weight average molecular weight in the range of from about 250,000 to 1,000,000 and a molecular weight distribution of about 10 to 15. For high speed spinning and fiber forming, the molecular weight distribution is preferably about 2.5 to 4.5 and the weight average molecular weight low to reduce polymer viscosity. However, when the weight average molecular weight is reduced below about 130,000, the polypropylene resin cannot be easily commercially processed into pellets. The low viscosity polymer instead produces poorly formed pellets which are difficult to convey and handle. Therefore, polymer producers prefer that the degradation of polypropylene prior to delivery be limited to produce a molecular weight greater than about 160,000.

Many prodegradants are available to degrade polymers, but the organic peroxides are most frequently used. While the invention is not to be limited to a particular theory, it is believed that the organic peroxide molecules react by decomposing when exposed to heat to form two or more free radicals. The free radicals then attack the polymer, splitting the polymer molecule, and thereby reducing its molecular weight and narrowing its molecular weight distribution. The rate of the peroxide decomposition is defined in terms of half-lives, i.e. the time required at a given temperature for one-half of the peroxide molecules to decompose. To make a polymer pellet containing unreacted prodegradant, it is therefore necessary to use more stable peroxides and critically control and specify the peroxide (polymer) temperature and the length of time the peroxide is exposed to that temperature. For example, using Lupersol 101 under standard pelletizing conditions (450° F., 2½ minutes residence time), only $2 \times 10^{-13}\%$ of the peroxide would survive pelletizing.

In accordance with the invention a free radical source prodegradant having a half-life in polypropylene in excess of one-half minute at 375° F. is added to a high molecular weight polypropylene reactor flake (or pellets) in an amount sufficient to produce the final polymer properties desired by the polymer processor. If it is desired that a greater amount of prodegradant make it through the pelletization step unreacted, it is also possible to inject the prodegradant into the molten polymer stream in the extruder thus reducing residence time. As the prodegradant must be dispersed uniformly to be most effective, the injection should be followed by a mixing step.

In general, the prodegradant should not interfere with or be adversely affected by commonly used polypropylene stabilizers and should effectively produce free radicals that upon decomposition initiate polypropylene degradation. The prodegradant should have a short enough half-life at the polymer processor's re-extrusion temperatures, however, so as to be essentially entirely reacted before exiting the processor's extruder. Preferably they have a half-life in the polypropylene of less than 9 seconds at 550° F. so that at least 99% of the prodegradant reacts in the molten polymer reacts before 1 minute of extruder residence time. Such prodegradants include, by way of example and not limitation, the following: 2,5-dimethyl 2,5 bis-(t-butylperoxy) hexyne-3 and 4 methyl 4 t-butylperoxy-2 pentanone (e.g. Lupersol 130 and Lupersol 120 available from Lucidol Division, Penwalt Corporation), 3,6,6,9,9-pentamethyl-3-(ethyl acetate)1,2,4,5-textraoxy cyclononane (eg. USP-138 from Witco Chemical Corporation), 2,5-dimethyl - 2,5 bis-(t-butylperoxy) hexane (e.g., Lupersol 101) and $\alpha,\alpha'$ bis-(tert-butylperoxy) diisopropyl benzene (eg. Vulcup R from Hercules, Inc.). Preferred concentrations of the free radical source prodegradants are in the range of from about 0.01 to 0.4 percent based on the weight of the polymers when the peroxide containing pellets are 100% of the feed to the processor's extruder. If the peroxide-containing pellets are to be added as a concentrate to another polymer composition, for example, at 5 to 20% of the total pellets, the peroxide-containing pellets will contain about 0.4 to 10% peroxide by weight. Preferably the pelletizer is operated to retain at least 75% of the added prodegradant in the pellets. When subjected to extruding temperatures by the polymer processor, the degradation of the polymer by the prodegradant will resume and proceed to the extent desired, essentially completing the reaction in the polymer processor's re-extrusion process. Generally such extruder temperatures are in the range of from about 460° F. to 550° F. Alternatively, these conditions may be obtained for degradation downstream from the extruder.

In the following examples, melt indices were determined using a melt indexer (ASTM 1238) operated at 177° F. with a 2160 g. weight. Samples were allowed to heat to equilibrium for 5 minutes prior to testing. The melt index is equivalent to the grams exiting a 0.0825 inch diameter capillary in a period of 10 minutes.

EXAMPLES

EXAMPLE 1

A polypropylene reactor flake was obtained that had a melt index less than one. 0.275 weight percent Lupersol 130 was added to the flake and a homogeneous blend made. This blend was pelletized in pelletizing equipment operated at 375° F. with a residence time of about 2 minutes. Calculations show about 22% of the peroxide had reacted. The pellets were tested and found to have a melt index of about 55. Approximately 10% of the prodegradant in the pellets reacted in the melt indexer so that actual melt index may be considered to be in the 40–45 range for the peroxide containing pellets. This polymer was easily pelletized and produced polymer pellets equivalent in handleability to normal commercial pellets.

These pellets were then re-extruded at 460° F. with an extruder residence time of about 3 minutes. The extrudate was then tested and found to have a melt index of about 550. To verify that the 460° F. extrusion step did not appreciably affect the melt index, the extrudate was re-extruded and the melt index increased from 550 to 580. Thus, about 95% of the melt index increase in the first re-extrusion was due to the residual prodegradant in the pellets and about 5% due to the action of the extruder.

EXAMPLE 2

The same flake and equipment were used as in Example 1 except that 0.3% Lupersol 130 was added to the flake. The pellets were found to have a melt index of 45–50. As in Example 1, the pellet cut was commercially acceptable. Upon re-extrusion, the extrudate was found to have a melt index of about 660.

EXAMPLE 3

Witco Chemical USP-138 was applied to the flake of Example 1 at a concentration of 0.35 weight percent. The blend was extruded at 375° F. for an extruder residence time of about 2 minutes. The melt index of the extruded sample was found to be about 15. The sample was re-extruded at 485° F. with a 3 minute residence time and the melt index was found to be 215. The flake without peroxide added but processed in the above manner had a melt index of 1.7.

EXAMPLE 4

Figure 2:
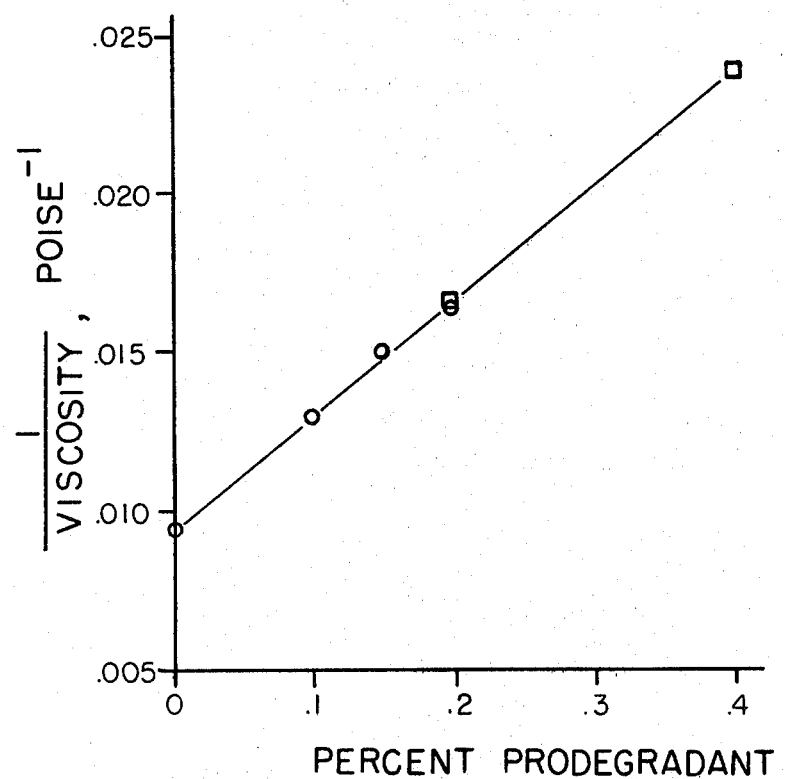
FIG. 2 is a graph of the inverse of the viscosity of a polymer exiting an extruder versus percent prodegradant that reacted as a liquid or as a concentrate in the polymer.

Two percent Lupersol 130 was blended with commercially available polypropylene pellets identified as Hercules PC-973. This blend was then extruded at 340° F. with a one minute residence time. Calculations show 98% of the peroxide remained unreacted in the extrudate. Various percentages of this peroxide concentrate were then blended with standard PC 973 polypropylene pellets. Calculated equivalent amounts of the pure peroxide were added to other standard PC 973 pellets. The concentrate/polypropylene blend and liquid peroxide/polypropylene blend were extruded through a Brabender extruder at 465° F. with a seven minute residence time. The viscosities exiting the extruder die tip were determined and are shown in FIG. 2. It can be seen that the use of the concentrate peroxide form gives equivalent results to addition of pure peroxide to the pellets. In FIG. 2 "Lupersol 130 in PC-973" refers to the concentrate blended with PC-973 and "Lupersol 130 on PC-973" refers to pure peroxide applied on all the extruded pellets.

In many cases it may be advantageous to utilize a lower melting point, compatible polymer to form concentrates with higher peroxide contents. For example, when treating polypropylene, a concentrate formed at lower temperatures in lower melting polymers such as polymers and copolymers of butene, and pentene, will greatly decrease the rate of reaction of prodegradants making formation of concentrates easier. Specifically, a copolymer of butene and less than 5% ethylene (Shell DP 8010) melts at about 100° C. Only 0.1% of Lupersol 101 prodegradant would react if pelletized at 20° C. above the melting point of the copolymer whereas 52% of the prodegradant would react at 20° C. above the melting point of polypropylene with an extruder residence time of 3 minutes.

EXAMPLE 5

Polypropylene having a melt index of 2 was processed in an Egan 2 inch diameter, 36 to 1 (L/D) pelletizing extruder having seven heating zones. The first two zones were set at 440° F. to ensure complete polymer melting, and the remaining zones were set to achieve gradual cooling to about 330° F. to 340° F. prior to injection of Lupersol 101 peroxide. At a point 62 inches from the extruder throat and 10 inches from the exit, liquid Lupersol 101 peroxide was injected into the polypropylene at a rate to form a 6.3% (by weight) peroxide/polypropylene concentrate. The five strand extrudate was immediately water quenched and easily cut to form very uniformly shaped pellets.

The temperature at the point of injection was between 317° F. and 321° F. as read from a deep well thermocouple. Estimated exposure time for the peroxide at the elevated temperatures was less than about one minute.

Using the relationships discussed below, it was determined that less than about 4% of the injected peroxide had reacted at this temperature and time period or less than 0.25% (0.04×6.3%). The viscosity of the polymer remained high enough for easy pelletizing.

This concentrate was diluted by blending with 20 parts of PC-973 polypropylene per one part of concentrate. The blend was extruded through a ¾" Model 250 Brabender extruder with a temperature profile of 375° F., 400° F., 460° F. The viscosity was determined to be 61.7 poise at 460° F. Generating a curve like that of FIG. 2, the concentrate was determined to contain about 6% peroxide.

Thus, the invention includes prodegradant concentrates which can be added to non-prodegradant containing pellets to gain desired results. Concentrations of up to 10% by weight prodegradant can be formed with ease, and higher concentrations are possible.

While it is not desired to limit the invention to any particular theory, the significance of certain prodegradant characterists may be postulated. From half-life determinations it can be shown that half-life reaction rate coefficients, k, in polypropylene approximately follow an Arrhenius relationship to give:

$$\ln k = -19,700/T + 40.4 \text{ (for Lupersol 130)}$$

$$\ln k = -19,700/T + 41.6 \text{ (for Lupersol 101)}$$

Where k=half-life reaction rate coefficient in polypropylene, min.$^{-1}$, and T=temperature, °K.

Having determined k, the following equation may be used to find the amount of unreacted prodegradant after a given time:

$$C_A/C_{\text{Å}} = e^{-kt}$$

where
$C_A$=concentration of unreacted prodegradant;
$C_{\text{Å}}$=initial prodegradant concentration; and
t=reaction time, min.

These relationships can be used to show that, after one minute at 410° F. (483° K.), 50% of the original Lupersol 130 would remain unreacted as compared to only 10% for Lupersol 101 under the same conditions.

In addition, it was found that the polymer viscosity exiting a piece of equipment can be predicted by the following equation:

$$1/\mu = 1/\mu^\circ + KC_R$$

Where:
$\mu$=polymer viscosity exiting the equipment after chemical degradation;
$\mu^\circ$=viscosity the polymer would have had exiting without chemical degradation;
K=chemical degradation efficiency coefficient; and
$C_R$=amount of prodegradant reacted during extrusion.

Since $C_R = C_{\text{Å}} - C_{A'}$ combining the above equations gives the following equation:

$$1/\mu = 1/\mu^\circ + K\,C_{\text{Å}}(1 - e^{-kt})$$

Thus, for a given value of ($KC_{\text{Å}}$), the ultimate polymer viscosity will be the same after a long reaction time regardless of prodegradant used, reflecting thermal degradation. However, the relationship between viscosity and time will depend upon the half-life reaction rate coefficient, k. For example, FIG. 1 is a graph of polypropylene viscosity exiting pelletizing equipment versus equipment residence time based on $KC_A$=0.005 poise$^{-1}$ (a typical value e.g. for Lupersol 130 or 101) and an initial polymer viscosity of 10,000 poise with the pelletizing/extrusion processes carried out at 395° F. It demonstrates that the "pelletizing" viscosity of the Lupersol 130 sample is about twice that of the Lupersol 101 sample at a normal pelletizing time range of 1 to 3 minutes even though the ultimate viscosities would be the same. This further emphasizes the significance of residence time and pelletizing extruder conditions in achieving the results of the present invention.

For a prodegradant with a short half-life, the viscosity of the polypropylene exiting a pelletizer at 395° F. after 1 minute residence time would be 196 poise as compared to 291 poise for Lupersol 101 and 661 poise for Lupersol 130. Thus, the latter is preferred, although the other peroxides listed may be used.

When a peroxide/polymer blend is pelletized in accordance with this invention, over 50% of the prodegradant may remain after pelletizing, but because the initial peroxide addition level is quite low and the peroxide is uniformly dispersed in the polymer, there is little or no danger in handling the peroxide containing polymer pellets. After re-extrusion there will be essentially no prodegradant remaining since typical processing conditions are at least 460° F. at which temperature even the Lupersol 130 half-life is less than 7 seconds. With an equipment residence time of only 2½ minutes, for example, less than 0.000021% of the peroxide in the pellets would remain in the extrudate. For example, if the polypropylene pellets had 0.2% Lupersol 130 as received from the producer, the processor's extrusion equipment was operated at 460° F., and the extruder residence time was 2½ minutes, the Lupersol 130 concentration in the polymer exiting the extruder would be less than 1 part per billion.

Thus it is apparent that there has been provided in accordance with the invention, a polymer composition maintaining easy pelletization for polymer producers while significantly improving the processor's ability to use it and a method for manufacturing the material that fully satisfy the objects, aims and advantages set forth above. While the invention has been described in connection with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. Method of producing polymer pellets having improved extrusion characteristics comprising the steps of:
   (a) providing a high weight average molecular weight polymer selected from the group consisting of polymers and copolymers of propylene and butylene,
   (b) adding to said polymer a free radical generating prodegradant having a half-life in said polymer of at least about one-half minute at pelletizing extrusion temperatures, and
   (c) pelletizing said polymer under conditions wherein greater than about 50% of that added and at least about 0.01% by weight of said prodegradant remains available for further degradation after pelletizing.

2. Method of claim 1 including the additional step of rapidly cooling said pellets to stop the reaction of said prodegradant.

3. Method of claim 1 wherein said prodegradant is selected from the group consisting of 2, 5-dimethyl-2,5 bis(t-butylperoxy) hexyne -3; 3, 6, 6, 9, 9 -pentamethyl-3-(ethyl acetate) - 1, 2, 4, 5 -tetraoxy cyclononane; 4 methyl 4 t-butylperoxy -2 pentanone; α,α'-bis (t-butylperoxy) diispropyl benzene; and 2,5-dimethyl -2, 5-di (t-butylperoxy) hexane.

4. Method of claim 1 wherein said polymer is polypropylene.

5. Method of claim 3 wherein said polymer is polypropylene.

6. Method of claim 4 wherein said polymer has a weight average molecular weight in the range of from about 250,000 to 1,000,000.

7. Method of claim 4 wherein said prodegradant is added in an amount in the range of from about 0.01 to 10% based on the polymer weight and said prodegradant remaining available is at least 75% of that added.

8. Method of claim 4 including the additional step of reextrusion wherein the polymer produced has a weight average molecular weight in the range of from about 40,000 to 130,000 with a molecular weight distribution in the range of from about 2.5 to 4.5 upon reextrusion.

9. Method of claim 7 wherein said prodegradant remaining is at least 90%.

10. Pellets of a polymer selected from the group consisting of polymers and copolymers of propylene and butylene having dispersed therein a free radical source prodegradant having a half-life in said polymer of at least about one-half minute at pelletizing extrusion temperatures in an amount of at least 0.01% unreacted.

11. Pellets of claim 10 wherein said prodegradant is selected from the group consisting of 2, 5-dimethyl -2, 5 bis(t-butylperoxy) hexyne -3; 3, 6, 6, 9, 9 - pentamethyl - 3 -(ethyl acetate) -1, 2, 4, 5 - tetraoxy cyclononane; 4 methyl 4 t-butylperoxy -2 pentanone; α,α' -bis (t-butylperoxy) diispropyl benzene; and 2, 5-dimethyl -2, 5-di (t-butylperoxy) hexane.

12. Pellets of claim 11 wherein said polymer is polypropylene.

13. Pellets of claim 10 wherein said prodegradant is present in an amount in the range of from about 0.4 to 10% by weight forming a concentrate for addition to non-prodegradant containing polymer pellets.

14. Pellets of claim 13 wherein said polymer is polypropylene.

15. Pellets of claim 13 wherein said polymer is polybutylene.

16. The pellets of claim 13 wherein said polymer is a copolymer of propylene.

17. Pellets of claim 13 wherein said polymer is a copolymer of butylene.

18. Method of claim 1 wherein said polymer is a copolymer of propylene.

19. Method of claim 1 wherein said polymer is a copolymer of butylene.

* * * * *